(12) United States Patent
Lee et al.

(10) Patent No.: US 7,576,767 B2
(45) Date of Patent: Aug. 18, 2009

(54) PANORAMIC VISION SYSTEM AND METHOD

(75) Inventors: Louie Lee, Richmond Hill (CA); Masoud Vakili, Toronto (CA)

(73) Assignee: Geo Semiconductors Inc., Santa Clara, CA (US)

(*) Notice: Subject to any disclaimer, the term of this patent is extended or adjusted under 35 U.S.C. 154(b) by 953 days.

(21) Appl. No.: 10/899,410

(22) Filed: Jul. 26, 2004

(65) Prior Publication Data

US 2006/0017807 A1    Jan. 26, 2006

(51) Int. Cl.
*H04N 13/00* (2006.01)
*G09G 5/00* (2006.01)

(52) U.S. Cl. .................. 348/36; 348/42; 345/645

(58) Field of Classification Search ............ 348/36, 348/42, 14.1, 148, 745; 345/645; 375/240.12
See application file for complete search history.

(56) References Cited

U.S. PATENT DOCUMENTS

| | | | |
|---|---|---|---|
| 5,185,667 A | | 2/1993 | Zimmermann |
| 5,353,061 A | * | 10/1994 | Rodriguez et al. ..... 375/240.12 |
| 5,369,450 A | * | 11/1994 | Haseltine et al. ........... 348/745 |
| 5,465,163 A | | 11/1995 | Yoshihara et al. |
| 5,699,444 A | | 12/1997 | Palm |
| 5,949,331 A | | 9/1999 | Schofield et al. |
| 5,978,521 A | | 11/1999 | Wallack et al. |
| 6,163,361 A | | 12/2000 | McIntyre et al. |
| 6,184,781 B1 | | 2/2001 | Ramakesavan |
| 6,424,273 B1 | | 7/2002 | Gutta et al. |
| 6,498,620 B2 | * | 12/2002 | Schofield et al. ........... 348/148 |
| 7,126,616 B2 | * | 10/2006 | Jasa et al. ................... 345/645 |
| 7,239,360 B2 | * | 7/2007 | Bassi et al. ................. 348/745 |
| 2002/0027597 A1 | * | 3/2002 | Sachau ....................... 348/14.1 |
| 2003/0103141 A1 | | 6/2003 | Bechtel et al. |

OTHER PUBLICATIONS

Office Action in relation to the corresponding Taiwan Application No. 94121880.
The following three notices (1)-(3) are PCT notices in the corresponding PCT Application No. PCT/US04/23849.
Notification of Transmittal of the International Search Report and the Written Opinion of the International Searching Authority, or the Declaration.
International Search Report.
Written Opinion of the International Searching Authority.

* cited by examiner

*Primary Examiner*—Gims S Philippe
(74) *Attorney, Agent, or Firm*—Sughrue Mion PLLC

(57) ABSTRACT

A distortion corrected panoramic vision system and method provides a visually correct composite image acquired through wide angle optics and projected onto a viewing surface. The system uses image acquisition devices to capture a scene up to 360° or 4π steradians broad. An image processor corrects for luminance or chrominance non-uniformity and applies a spatial transform to each image frame. The spatial transform is convolved by concatenating the viewing transform, acquisition geometry and optical distortion transform, and display geometry and optical transform. The distortion corrections are applied separately for red, green, and blue components to eliminate lateral color aberrations of the optics. A display system is then used to display the resulting composite image on a display device which is then projected through the projection optics and onto a viewing surface. The resulting image is visibly distortion free and matches the characteristics of the viewing surface.

50 Claims, 15 Drawing Sheets

PANORAMIC VISION SYSTEM AND METHOD

FIELD OF THE INVENTION

This invention relates to vision systems, particularly to panoramic vision systems with image distortion correction.

BACKGROUND OF THE INVENTION

Improved situational awareness is increasingly required for many applications including surveillance systems, video-conference vision systems, and vehicle vision systems. Essential to such applications is the need to monitor a wide operating area and to form a composite image for easy comprehension in different user modes. To minimize the number of cameras and cost, cameras with panoramic lens enable a wide field of view but will have distortions due to inherent geometric shape and optical non-linearity. In a surveillance application, multiple panoramic cameras may cover the entire exterior and interior area of a building, and the system can provide continuous view of the area and, manually or automatically, track objects through the area.

In a vehicle vision system, multiple panoramic cameras can provide a full 360° view of the area and around obstructive objects. Such systems can adapt display views to specific operator modes such as turning, reversing, and lane changing to improve situational awareness. Additional advantages of a vehicle vision system are reducing the wind drag and noise caused by side mirrors, and reducing the width span of the vehicle by eliminating such protruding mirrors. These systems can also have the capability to detect objects in motion, provide warning of close objects, and track such objects through multiple viewing regions. Vision systems could also greatly enhance night vision through various technologies such as infrared, radar, and light sensitive devices.

Vision systems consist of one or more image acquisition devices, coupled to one or more viewable display units. An image acquisition device can incorporate different lenses with different focal lengths and depths of focus such as planar, panoramic, fish-eye, and annular. Lenses like fish-eye and annular have a wide field of view and a large depth of focus. They can capture a wide and deep field of view. They tend, however, to distort images, especially the edges. Resulting images look disproportionate. In any type of lens, there are also optical distortions caused by tangential and radial lens imperfections, lens offset, focal length of the lens, and light falloff near the outer portions of the lens. In a vision system, there are yet other types of image distortions caused by luminance variations and color aberrations. These distortions affect the quality and sharpness of the image.

Prior art panoramic vision systems do not remove image distortions while accurately blending multiple images. One such panoramic system is disclosed in U.S. Pat. No. 6,498,620B2, namely a rearview vision system for a vehicle. This system consists of image capture devices, an image synthesizer, and a display system. Neither in this document, nor in the ones referenced therein, is there an electronic image processing system correcting for geometric, optical, color aberration, and luminance image distortions. In the United States Patent Application Publication No. 2003/0103141A1 a vehicle vision system includes pre-calibration based luminance correction only but not other optical and geometric corrections. A thorough luminance and chrominance correction should be based on input and output optical and geometric parameters and be adaptive for changing ambient environments.

Distorted images and discontinuity between multiple images slow down the operator's visual cognizance, and as such, her/his situational awareness, resulting in potential errors. This is one of the most important impediments in launching an efficient panoramic vision system. It is therefore desirable to provide a panoramic vision system with accurate representation of the situational view via removing geometric, optical, color aberration, luminance, and other image distortions and providing a composite image of multiple views. Such corrections will aid visualization and recognition and will improve visual image quality.

SUMMARY OF THE INVENTION

The present invention in one aspect provides a panoramic vision system having associated camera, display optics and geometric characteristics, said system comprising:
 (a) a plurality of image acquisition devices to capture image frame data from a scene and to generate image sensor inputs, said image frame data collectively covering up to a 360° field of view, said image acquisition devices having geometric and optical distortion parameters;
 (b) a digitizer coupled to the plurality of image acquisition devices to sample and convert the image frame data and the image sensor inputs into digital image data;
 (c) an image processor coupled to the digitizer comprising:
   (i) an image measurement device to receive the digital image data and to measure the image luminance histogram and the ambient light level associated with the digital image data;
   (ii) a luminance correction module coupled to the image measurement device to receive the digital image data along with the camera, display optics and geometric characteristics, the image luminance histogram and the ambient light level, and to correct for luminance non-uniformities and to optimize the luminance range of selected regions within the digital image data;
   (iii) a convolution stage coupled to the luminance correction module to combine the geometric and optical distortion parameters including the image sensor inputs, the camera, display optics and geometric characteristics and imperfections associated therein to form convoluted distortion parameters;
   (iv) a distortion correction module coupled to the convolution stage to generate and apply a distortion correction transformation based on the convoluted distortion parameters to the digital image data to generate corrected digital image data;
   (v) a display controller coupled to the distortion correction module to synthesize a composite image from the corrected digital image data; and
 (d) a display system coupled to said image processor to display the composite image on a viewing surface for viewing, said composite image being visually distortion free.

In another aspect, the present invention provides a method for providing panoramic vision using a panoramic vision system having camera, display optics and geometric characteristics as well as geometric and optical distortion parameters, to generate a composite image that covers up to 360° or 4π steradians, said method comprising:
 (a) acquiring image frame data from a scene, said image frame data collectively covering up to 360° or 4π steradian field of view, and generating a set of image senor inputs;

(b) converting the image frame data and the image senor inputs into digital image data, said digital image data being associated with an image luminance histogram and an ambient light level;

(c) obtaining the camera, display optics and geometric characteristics, the image luminance histogram and the ambient light level and correcting for luminance non-uniformities to optimize the luminance range of selected regions within the digital image data;

(d) convoluting the geometric and optical distortion parameters including the image sensor inputs, the camera, display optics and geometric characteristics and imperfections associated therein to form convoluted distortion parameters;

(e) generating and applying the distortion correction transformations to the digital image data, said distortion correction transformations being based on the convoluted geometric and optical distortion parameters to generate corrected digital image data;

(f) synthesizing a composite image from the corrected digital image data; and (g) displaying the composite image on a viewing surface for viewing, said composite image being visually distortion free.

In another aspect, the present invention provides an image processor, for use in a panoramic vision system having associated camera, display optics and geometric characteristics as well as geometric and optical distortion parameters, said panoramic vision system using a plurality of image acquisition devices to capture image frames from a scene and to generate digital image data and image sensor inputs and a digitizer to convert the digital image data and the image sensor inputs into digital image data, said image processor comprising:

(a) an image measurement device to receive the digital image data and to measure the image luminance histogram and the ambient light level associated with the digital image data;

(b) a luminance correction module coupled to the image measurement device to receive the digital image data along with the camera, display optics and geometric characteristics, the image luminance histogram, and the ambient light level and to correct for luminance non-uniformities and to optimize the luminance range of selected regions within the digital image data;

(c) a convolution stage coupled to the luminance correction module to combine the geometric and optical distortion parameters including the image sensor inputs, the camera, display optics and geometric characteristics and imperfections associated therein to form convoluted distortion parameters;

(d) a distortion correction module coupled to the convolution stage to generate and apply a distortion correction transformation, based on the convoluted distortion parameters, to the digital image data to generate corrected digital image data; and (e) a display controller coupled to the distortion correction module to synthesize a composite image from the corrected digital image data.

The present invention in its first embodiment provides a vehicle vision system covering up to 360° horizontal field of view, and up to 180° vertical field of view coverage, with emphasis on the rear, side, and corner views. The situational display image can be integrated with other vehicle information data such as vehicle status or navigation data. The image is preferably displayed on the front panel, contiguous with the driver's field of view. Additional views can be displayed to improve coverage and flexibility such as interior dashboard corner displays that substitute mirrors, eliminating exposure to the external elements and wind drag. The system is adapted to reconfigure the display and toggle between views based on control inputs, when one view becomes more critical than others.

For instance, the display reconfigures to show a wide view of the rear bottom of the vehicle when the vehicle is backing up, or the right side view when the right turning signal is turned on and the vehicle runs at higher speed, or the right corner view when the right turning signal is active and the vehicle is stopped or runs at low speed. In a preferred embodiment, the system provides such facilities as parking assistance, or lane crossing warning via pattern recognition of curbs, lanes, and objects as well as distance determination.

In another embodiment, the present invention provides a surveillance system covering up to 360° horizontal or $4\pi$ steradian field of view of the exterior and/or interior of a structure such as a building, a bridge, etc. The system can provide multiple distortion corrected views to produce a continuous strip or scanning panoramic view. The system can perform motion detection and object tracking over the surveillance area and object recognition to decipher people, vehicles, etc.

In yet another embodiment, the invention provides a videoconference vision system producing a wide view of up to 180° or a circular view of up to 360°. In this embodiment, the invention facilitates viewing the participants of a conference or a gathering and provides ability to zoom in on speakers with a single camera.

Further details of different aspects and advantages of the embodiments of the invention will be revealed in the following description along with the accompanying drawings.

DETAILED DESCRIPTION OF THE INVENTION

Figure 1:
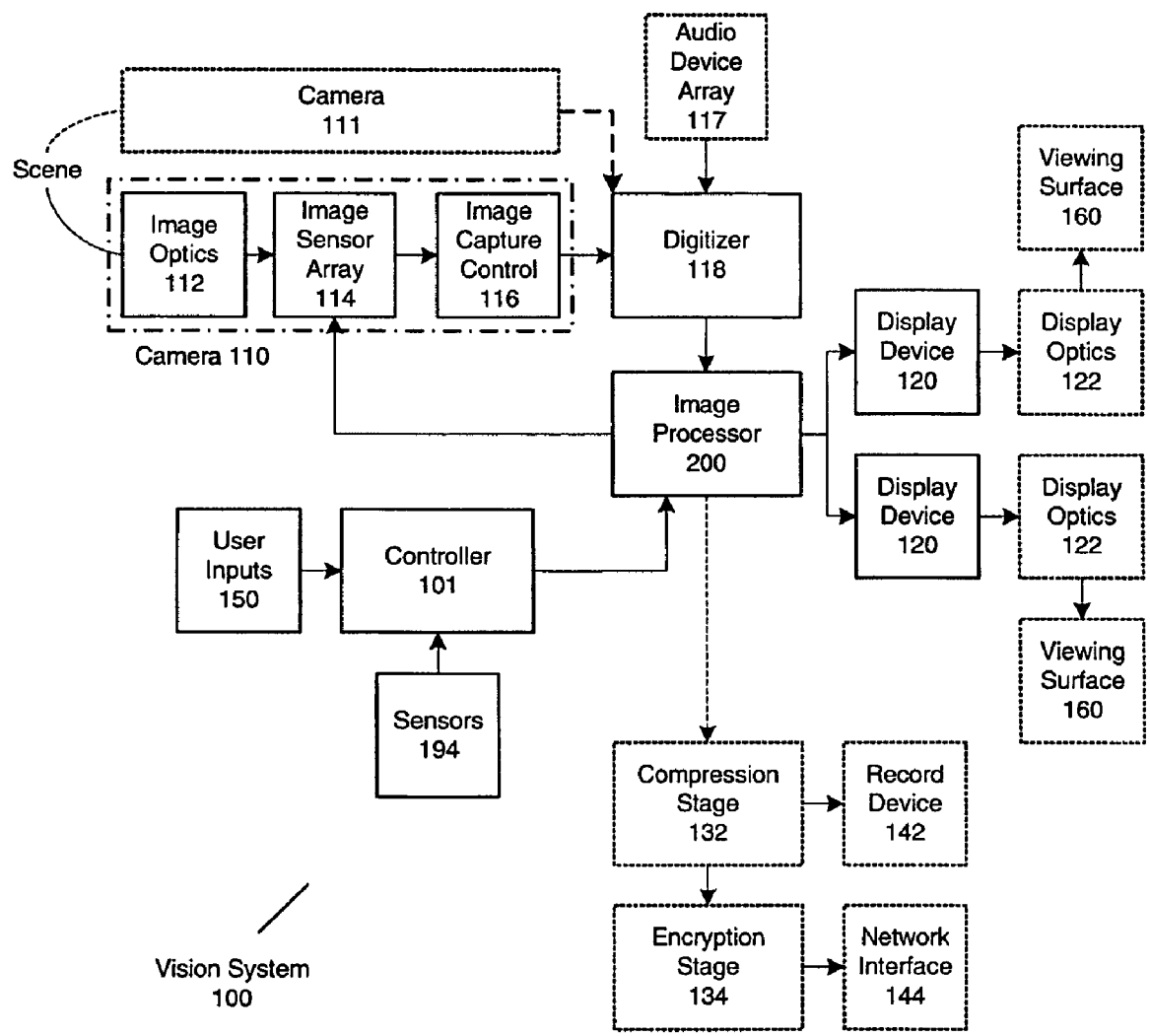
FIG. 1 represents an overall view of a vision system and its components built in accordance with the present invention.

Built in accordance with the present invention, FIG. 1 shows the overall structure of vision system 100. It comprises a plurality of image acquisition devices like camera 110 to capture image frames, digitizer 118 to convert image frame data to digital image data, image processor 200 to adjust luminance and correct image distortions and form a composite image from digital image data and control parameters, controller 101 to relay user and sensor parameters to image processor 200, and display device 120 to display the composed image for viewing on the viewing surface 160. The final composed image in the present invention covers up to 360° including several specific regions of interest and is significantly distortion free. It greatly enhances situational awareness.

Camera 110 in FIG. 1 comprises image optics 112, sensor array 114 and image capture control 116. For applications requiring wide area coverage, image optics 112 may use a wide angle lens to minimize the number of cameras required. Wide angle lenses also have wider depth of focus, reducing the need for focus adjustment and its cost implementation. Such lenses have a field of view typically in excess of 100° and a depth of focus from a couple of feet to infinity. Both these properties make such lenses desirable for a panoramic vision system. Wide angle lenses have greater optical distortions that are difficult and costly to correct optically. In the present invention, electronic correction is used to compensate for any optical and geometric distortion as well as any other non-linearity and imperfection in the optics or projection path.

In the present invention, camera lenses need not be perfect or yield perfect images. All image distortions, including those caused by the lens geometry or imperfection, are mathematically modeled and electronically corrected. The importance of this feature lies in the fact that it enables one to use inexpensive wide-angle lenses with an extended depth of focus. The drawback of such lenses is the image distortion and luminance non-uniformity they cause; they tend to stretch objects, especially near the edges of a scene. This effect is well known, for example, for fish-eye or annular lenses. They make objects look disproportionate. There are bulk optic solutions available to compensate for these distortions. The addition of bulk optics, however, would make such devices larger, more massive, and more expensive. The cost of bulk optics components is fixed by the labor cost for such functions as polishing, alignment, etc. Electronic components however become constantly cheaper and more efficient. It is also well known that bulk optics can never remove certain distortions completely.

Another drawback of bulk optics solutions is the sensitivity to alignment and being rendered dysfunctional upon impact. There is therefore crucial need for electronic image corrections to make a vision system represent the true setting, while making it robust, and relatively economical. This is substantiated by the fact that in a vision system, electronic components are most likely needed anyway to accomplish other tasks. These tasks include panoramic conversion and display control. Image processor 200, described later in this section, provides these essential functions.

Image sensor array 114 is depicted in camera 110. The sensor array is adapted to moderate extreme variations of light intensity of the scene through the camera system. For a vision system to operate efficiently in different lighting conditions, there is need for a great dynamic range. This dynamic range requirement stems from the day and night variations in ambient light intensity as well a wide variation from incidental light sources at night. A camera sensor is basically a mosaic of segments, each exposed to the light from a portion of the scene, registering the intensity of the light as output voltages. Image Capture Control 116 sends image frame intensity information and based on these data it receives commands for integration optimization, lens iris control, and white balance control from image processor 200.

Digitizer 118 receives image data from image capture control 116 and converts these data into digital image data. In an alternative example, the function of digitizer 118 may be integrated in the image sensor 114 or image processor 200. In case of existing audio data acquisition, digitizer 118 receives these data from audio device array 117. It then produces digital audio data and combines these data with digital image data. The digital image data is then sent to image processor 200.

Figure 2A:
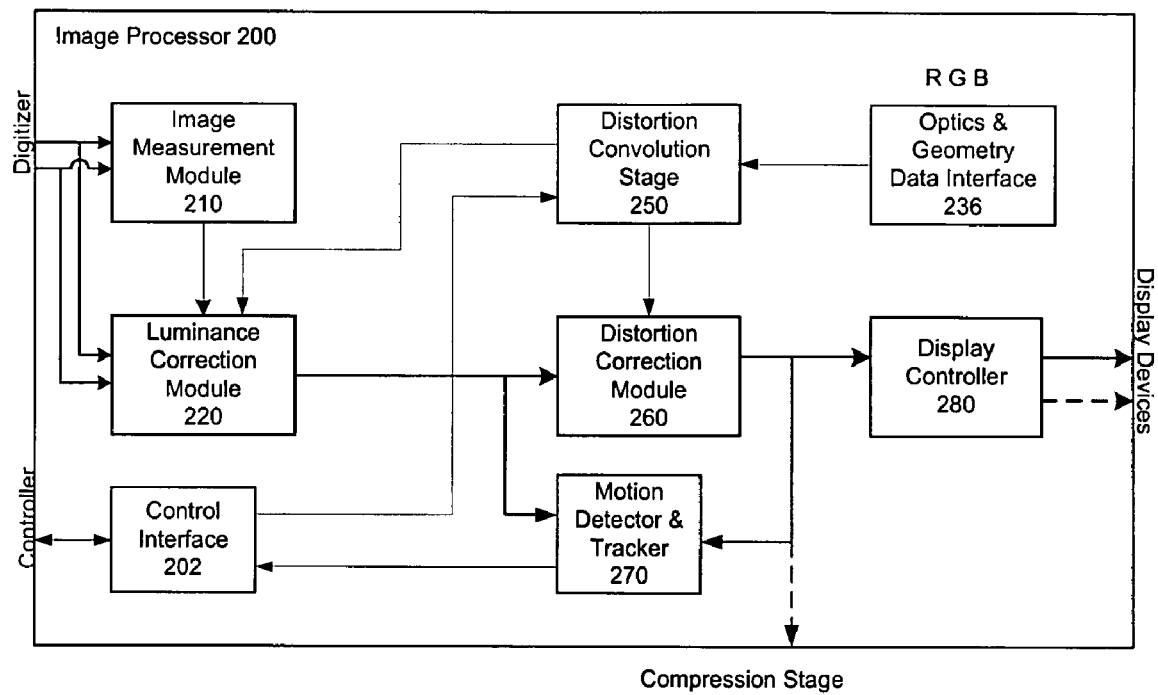
FIG. 2A represents the structure of the image processor of FIG. 1 as part of the vision system.

FIG. 2A shows image processor 200 in detail. The function of the image processor is to receive digital image data, measure image statistics, enhance image quality, compensate for luminance non-uniformity, and correct various distortions in these data to finally generate one or multiple composite images that are significantly distortion free. It comprises optics and geometry data interface 236, which comprises camera optics data, projection optics data, and projection geometry data, as well as control data interface 202, image measurement module 210, luminance correction module 220, distortion convolution stage 250, distortion correction module 260, and display controller 280. To understand the function of the image processor 200 it is important to briefly discuss the nature and causes of these distortions.

Ambient light and spot lighting can result in extreme variations in illumination levels, resulting in poor image quality and difficulty in image element recognition. In this invention, image processor 200 measures full and selective image areas and analyzes them to control exposure for best image quality in the area of interest. High light level sources such as headlights and spotlights are substantially reduced in intensity and low level objects are enhanced in detail to aid element recognition.

While the image sensor may be of any type and resolution, for applications identified in this invention, a high resolution solid state CCD or CMOS image sensor would be appropriate in terms of size, cost, integration, and flexibility. Typical applications include adjusting to wide varying ambient light levels by iris control and integration time. In addition to iris control and integration time control, luminance correction module 220 performs histogram analysis of the areas of interest and expands contrast in the low light area and reduces contrast in high light areas to provide enhanced image element recognition.

Luminance non-uniformities are undesired brightness variations across an image. The main physical reason for luminance non-uniformity is the fact that light rays going through different portions of an optical system, travel different distances and area densities. The intensity of a light ray falls off with the square of the distance it travels. This phenomenon happens in the camera optics as well as the display optics. In addition to this purely physical cause, imperfections in an optical system also cause luminance non-uniformity. Examples of such imperfections are projection lens vignette and lateral fluctuations and non-uniformity in the generated projection light. If the brightness variations are different for the three different color components, they are referred to as chrominance non-uniformity.

Another type of optical distortion is color aberration. It stems from the fact that an optical component like a lens has different indices of refraction for different wavelengths. Light rays propagating through optical components refract at different angles for different wavelengths. This results in lateral shifts of colors in images. Lateral aberrations cause different color component of a point object to separate and diverge. On a viewing surface a point would look fringed. Another type of color aberration is axial in nature and is caused by the fact that a lens has different focal points for different light wavelengths. This type of color aberrations could not be corrected electronically.

A variety of other distortions might be present in a vision system. Tangential or radial lens imperfections, lens offset, projector imperfections, and keystone distortions from off-axis projection are some of the common distortions.

In addition to the mentioned distortions, image processor 200 maps the captured scene onto a viewing surface with certain characteristics such as shape, size, and aspect ratio. For example an image can be formed from different sections of a captured scene and projected onto a portion of the windshield of a car, in which case it would suffer distortions because of the non-flat shape as well as particular size of the viewing surface. The image processor in the present invention corrects for all these distortions as explained below.

Referring now to the details of image processor 200 in FIG. 2A, digital image data are received by image measurement module 210, where image contrast and brightness histograms within the region of interest are measured. These histograms are analyzed by the luminance correction module 220 to control sensor exposure and to adjust the digital image data to improve image content for visualization and detection. Some adjustments include highlight compression, contrast expansion, detail enhancement, and noise reduction.

Along with this measurement information, luminance correction module 220 receives camera and projection optics data from optics and geometry data interface 236. These data are determined from accurate light propagation calculations and calibrations of the optical components. These data are crucial for luminance corrections since they provide the optical path length of different light rays through the camera as well as the projection system. Separate or combined camera and projection correction maps are generated to compute the correction for each pixel.

The correction map can be obtained off-line or it could be computed dynamically according to circumstances. The function of the luminance correction module 220 is therefore to receive digital image data and produce luminance-adjusted digital image data. In case of chrominance non-uniformity, luminance correction module 220 preferably applies luminance corrections separately to the three different color components. The physical implementation of luminance correction module 220 could be by a software program or a dedicated processing circuitry such as a digital signal processor or computational logic within an integrated circuit.

Luminance-adjusted image data should be corrected for geometric, optical, and other spatial distortions. These distortions are referred to as "warp" corrections and such correction techniques are called "image warping" in the literature. A discussion of image warping can be found in George Wolberg's "Digital Image Warping", IEEE Computer Society Press, 1988, hereby incorporated by reference.

Image warping is basically an efficient parameterization of coordinate transformations, mapping output pixels to input pixels. Ideally a grid data set represents a mapping of every output pixel to an input pixel. However, grid data representation is quite unforgiving in terms of hardware implementation because of the shear size of the look-up tables. Image warping, in this invention provides an efficient way to represent a pixel grid data set via a few parameters. In one example, this parameterization is done by polynomials of degree n, with n determined by the complexity of the combined distortion.

Different areas of the output space, in another example of this invention, are divided into patches with inherent geometrical properties to reduce the degree of polynomials. In principal, the higher the number of patches and degree of fitting polynomial per patch, the more accurate the parameterization of the grid data set. However, this has to be balanced with processing power for real time applications. Such warp maps therefore represent a mapping of output pixels to input pixels, representing the camera optics, display optics, and display geometry including the nature of the final composite image specification and the shape of viewing surface. In addition, any control parameter, including user input parameters are also combined with the above parameters and represented in a single transformation.

In addition to coordinate transformation, a sampling or filtering function is often needed. Once the output image pixel is mapped onto an input pixel, an area around this input pixel is designated for filtering. This area is referred to as the filter footprint. Filtering is basically a weighted averaging function, resulting in the intensities of constituent colors of an output pixel based on the all pixels inside the footprint. In a particular example, an anisotropic elliptical footprint is used for optimal image quality. It is known that the larger the size of the footprint, the higher the quality of the output image. Image processing 200, in the present invention, performs the image filtering with simultaneous coordinate transformation.

To correct for image distortions, all geometric and optical distortion parameters explained above are concatenated in the distortion convolution stage 250 for different color components. These parameters include camera optics data, projection optics data, projection geometry data, via Optics and geometry interface 236, and control inputs via control interface 202. The concatenated optical and geometric distortion parameters are then obtained by distortion correction module 260. The function of this module is to transform the position, shape, and color intensities of each element of a scene onto a display pixel. The shape of viewing surface 160 is taken into account in the projection geometry data 234. This surface is not necessarily flat and could be any general shape so long as a surface map is obtained and concatenated with other distortion parameters. The display surface map is convoluted with the rest of the distortion data.

Distortion correction module 260, in one example of the present invention, obtains a warp map covering the entire space of distortion parameters. The process is explained in detail in co-pending United States Patent Application Nos. 2003/0020732-A1 and 2003/0043303-A1 hereby incorporated by reference. For each set of distortion parameters, a transformation is computed to compensate for the distortions an image suffers when it propagates through the camera optics, through display optics, and onto the specific shape of the viewing surface 160. The formation of the distortion parameter set and the transformation computation could be done offline and stored in a memory to be accessed by image processor 200 via an interface. They could as well be done at least partly dynamically in case of varying parameters.

A display image can be composed of view windows that can be independent views or concatenated views. For each view window, the distortion correction module 260 interpolates and calculates from the warp surface equations the spatial transform and filtering parameters and performs the image transformation for display image.

For every image frame, distortion correction module 260 finds nearest grid data point in the distortion parameter space first. It then interpolates the existing transformation corresponding to that set of parameters to fit the actual distortion parameters. Correction module 260 then applies the transformation to the digital image data to compensate for all distortions. The digital image data from each frame of each camera is combined to form a composite image fitting the viewing surface and its substructure. The corresponding digital data are corrected in such a way that when an image is formed on the viewing surface, it is visibly distortion free and it fits an optimized viewing region on the viewing surface. The physical implementation of distortion correction module 260 could be by a software program on a general purpose digital signal processor or by a dedicated processing circuitry such as an application specific integrated circuit. A physical example of the image processor 200 is incorporated in the Silicon Optix Inc. sxW1 and REON chip.

Figure 2B:
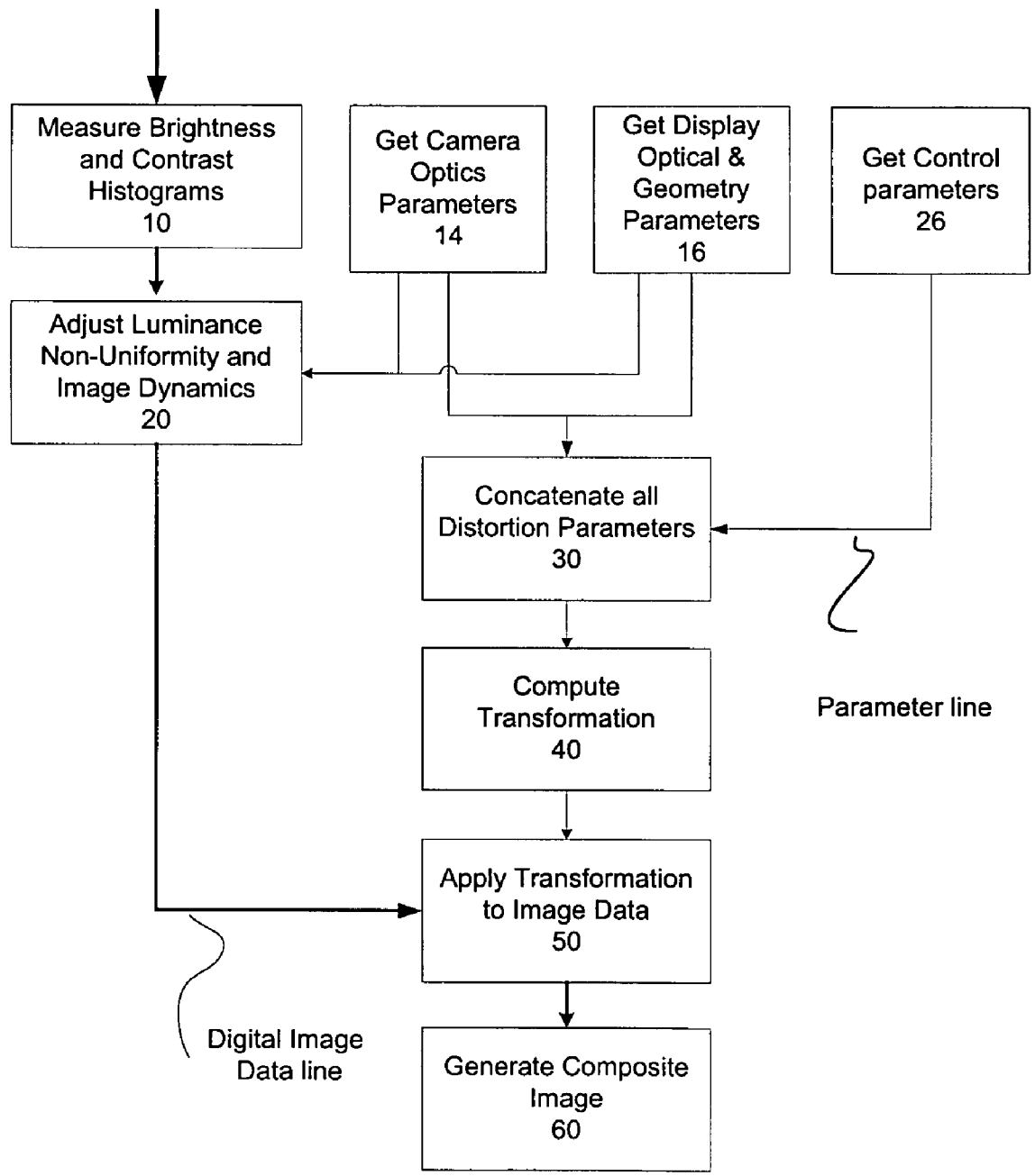
FIG. 2B represents the flow logic of the image processor of FIG. 1.

FIG. 2B shows the flow logic of image processor 200 in one example of the present invention. Digital data flow in this chart is indicated via bold lines whereas calculated data flow is depicted via thin lines. As seen in this figure, brightness and contrast histograms are measured from the digital data at step (10). Camera optics along with display optics and display geometry parameters are obtained in steps (14) and (16). These data are then obtained along with brightness and contrast histogram in step (20), where the image luminance nonuniformity is adjusted. Optics and geometry data from steps (14) and (16), as well as control parameters obtained in step (26), are then gathered at step (30). At this step, all distortion parameters are concatenated. A transformation inverting the effect of the distortions is then computed at step (40). This compensating transformation is then applied to the luminance-adjusted digital image data obtained from step (20).

As formerly explained, pixel data is filtered at this step for higher image quality. Accordingly, step (50) constitutes simultaneous coordinate transformation and image processing. At step (50), distortion-compensated digital image data are used to generate a composite image for display.

Once the digital image data for a frame are processed and composed, display controller 280 generates an image from these data. In an example of this invention, the image is formed on display device 120 which could be a direct view display or a projection display device. In one example, the image from a projection display device 120 is projected through display optics 122, onto viewing surface 160. Display optics 122 are bulk optics components to direct the projected light form display device 120 onto viewing surface 160. Any particular display system has additional optical and geometric distortions that need to be corrected. In this example, image processor 200 concatenates these distortions and corrects for the combined distortion.

It should be noted that the present invention is not limited to any particular choice of the display system; the display device could be provided as liquid crystal, light emitting diode, cathode ray tube, electroluminescent, plasma, or any other viable display choice. The display device could be viewable directly or it could be projected through the display optics onto an integrated compartment, serving as a viewing screen. Preferably, the brightness of the display system is adjusted via ambient light sensors, an independent signal, and a user dimmer switch. The size of the viewing surface is also preferably adjustable by the user for instance according to the distance from the operators' eyes.

Controller 101 interfaces with image processor 200. It acquires user parameters from user interface 150 along with inputs from the sensors 194 and sends them to the image processor 200 for display control. The user parameters are specific to the application corresponding to different embodiments of the invention. Sensors 194 preferably include ambient light sensors and direct glare sensors. The data from these sensors are used for display adjustment. Control parameters are convoluted with other parameters to provide a desired image.

For some applications of this invention, it could be desirable to record the data stream or to send it over the network to different clients. In both cases it is desirable and a necessity to compress the video data stream first to achieve storage and bandwidth limits. Compression stage 132, in one example, receives the video stream from image processor 200 and compresses the digital video data. Compressed data are stored in the record device 142 for future use. In another embodiment the data are encoded in the encryption stage 134 and sent over the network via network interface 144.

Figure 3A:
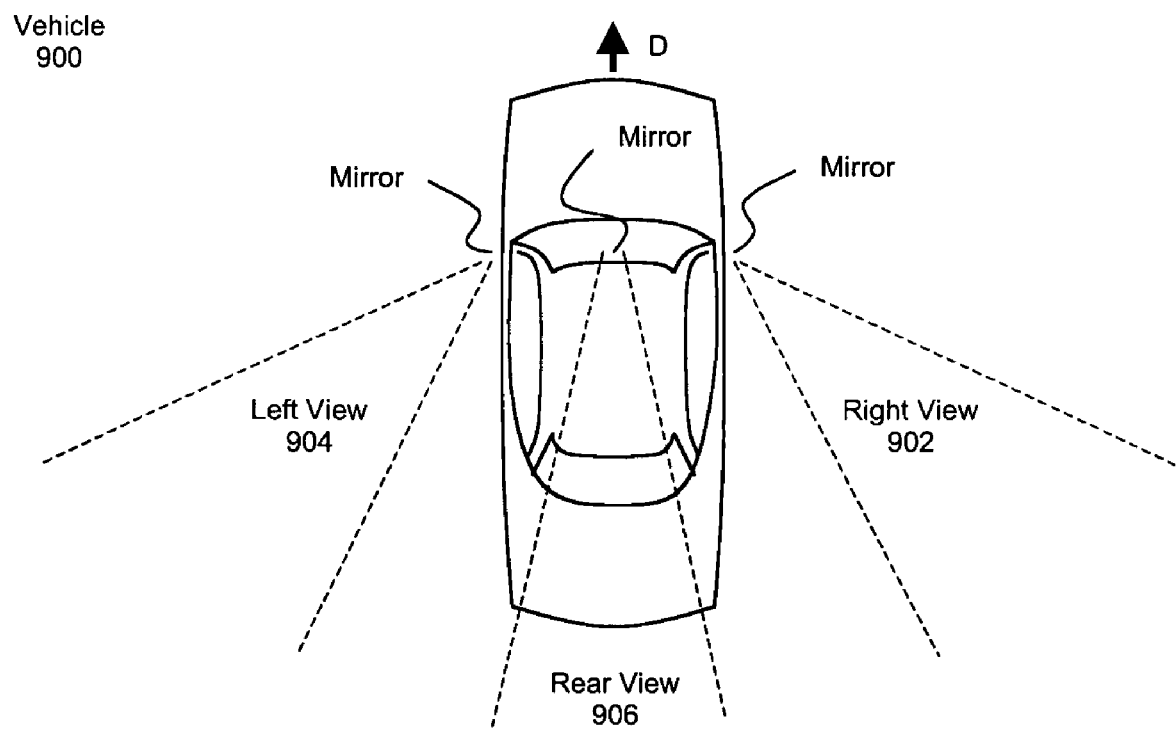
FIG. 3A represents a conventional vehicle with mirrors used for side and rear vision.

Having explained general features of the present invention in detail, a number of example implementations of vision system 100 will now be discussed. In one embodiment, the present invention provides a vehicle vision system. FIG. 3A shows a conventional automotive vehicle 900 with two side mirrors and an in-cabin mirror covering right view 902, left view 904, and rear view 906. It is well known that traditional mirror positions and fields of view cause blind spots and may have distortions due to wide viewing angle. It is hard to get complete situational awareness from the images provided by the three mirrors.

Figure 3B:
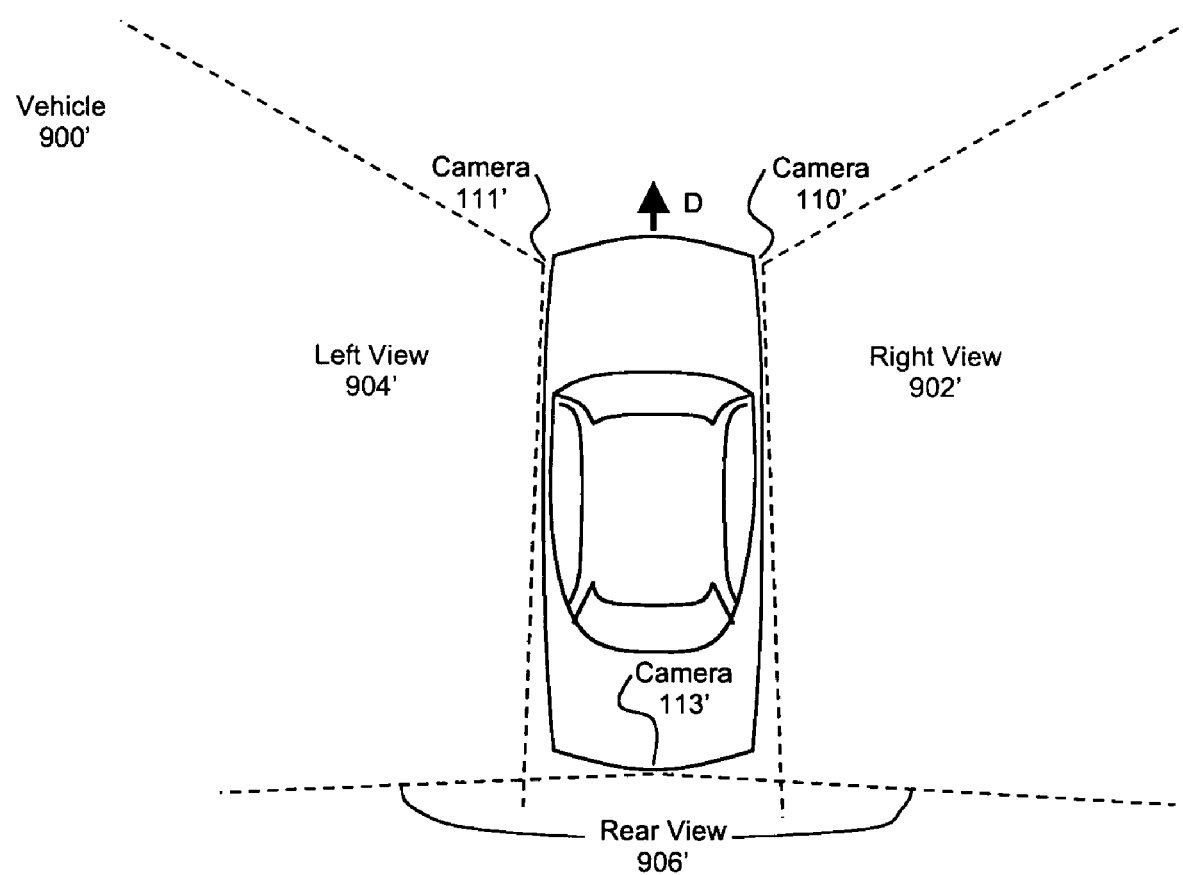
FIG. 3B represents an example setting for the cameras and their views in a vehicle example of the vision system.

In one example of the present invention illustrated in FIG. 3B, vehicle 900' is equipped with camera 110' and camera 111' forward of the driver seat. These positions increase coverage by overlapping with the driver's direct forward field of view. Camera 113' in this example is situated at the rear of the vehicle or in the middle rear of its roof. Specific areas of different views are selected to provide a continuous image without overlap. This prevents driver confusion.

Figure 3C:
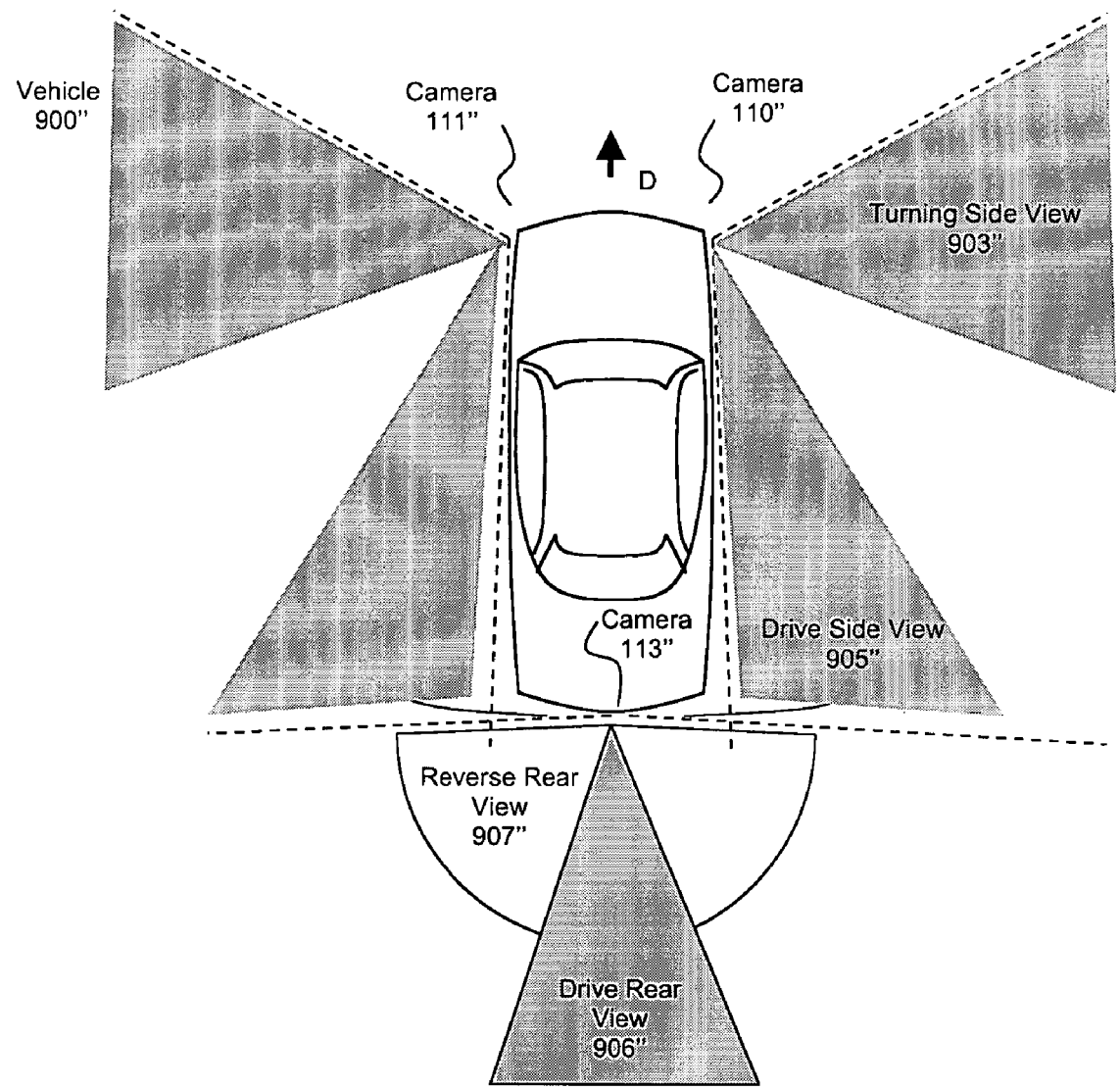
FIG. 3C represents selected views for the cameras in a vehicle example of the vision system.

In another example illustrated in FIG. 3C, vehicle 900" has camera 110" and camera 111" at the front corners of the vehicle and camera 113" at the center rear. In this example the emphasis is on adjustable views by user input or by control parameters. For example, turning side view 903" is made available when the turning signal is engaged. It should be noted that the coverage of this view is a function of user inputs, and in principal, covers the whole area between dashed lines. Similarly, drive side view 905" is used in regular driving mode and it is also expandable to cover the whole area between dashed lines. Rear view in this example has two modes depending on control parameters. When the vehicle is in reverse, reverse rear view 907" is used for display. This view yields a complete coverage of the rear of the vehicle, including objects on the pavement. This assures safer backing up and greatly facilitates parallel parking. When the vehicle is in drive mode, however, a narrower drive rear view 906" is used. These positions and angles ensure a convenient view of the exterior of the vehicle by the driver. This example significantly facilitates functions like parallel parking and lane change.

Figure 4A:
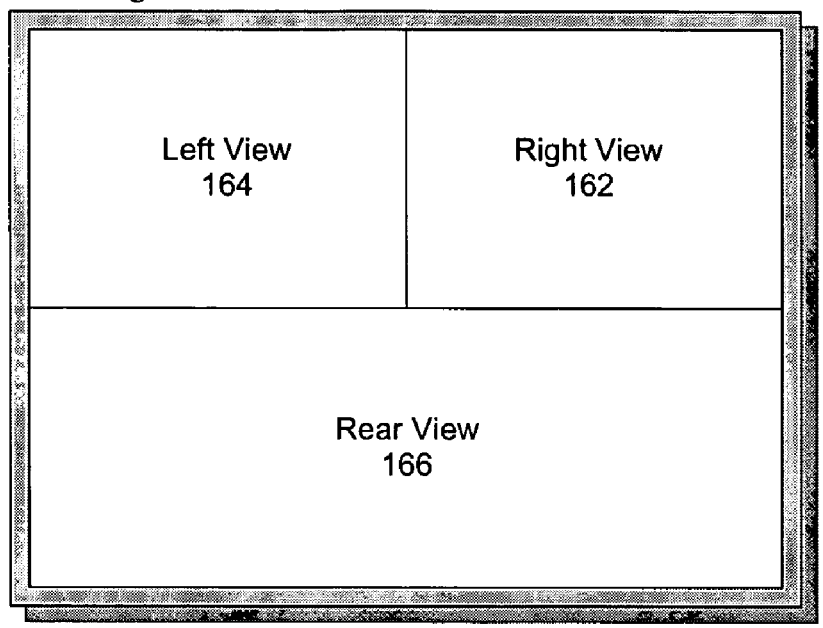
FIG. 4A represents the viewing surface of the vision system display in a vehicle vision system example.
Figure 4B:
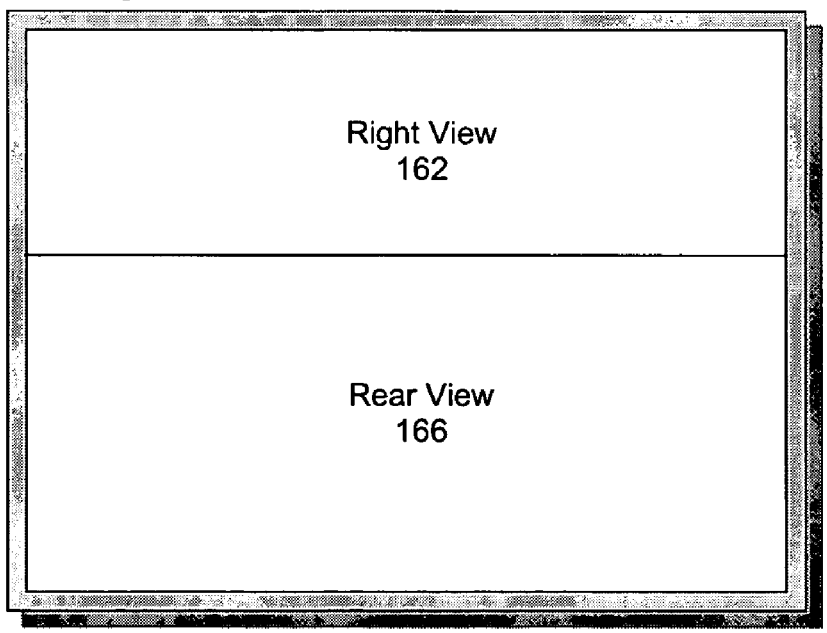
FIG. 4B represents the same viewing surface as FIG. 4A when the right turning signal is engaged in a vehicle vision system example.
Figure 5A:
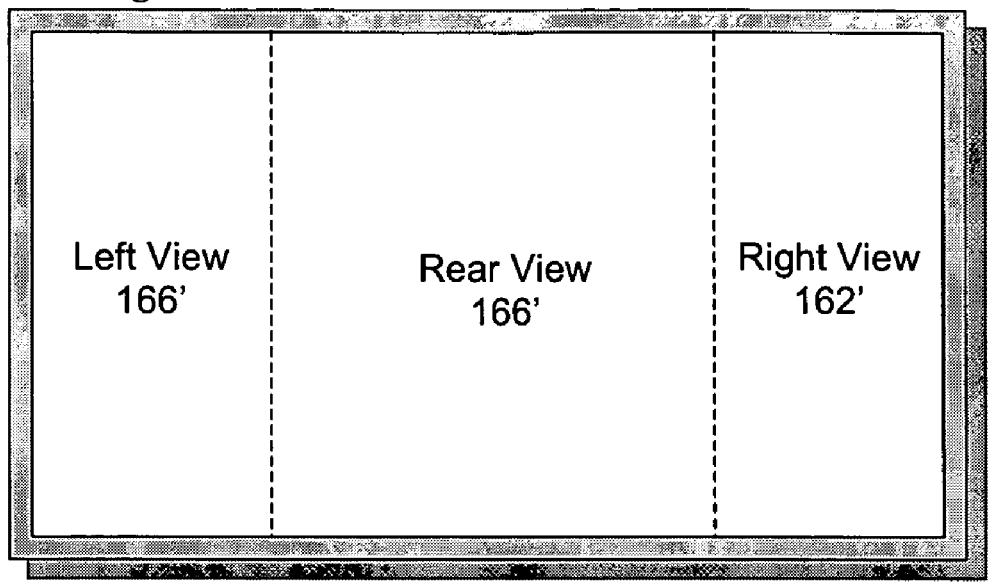
FIG. 5A represents a wide alternative of the viewing surface of the vision system display in a vehicle vision system example.
Figure 5B:
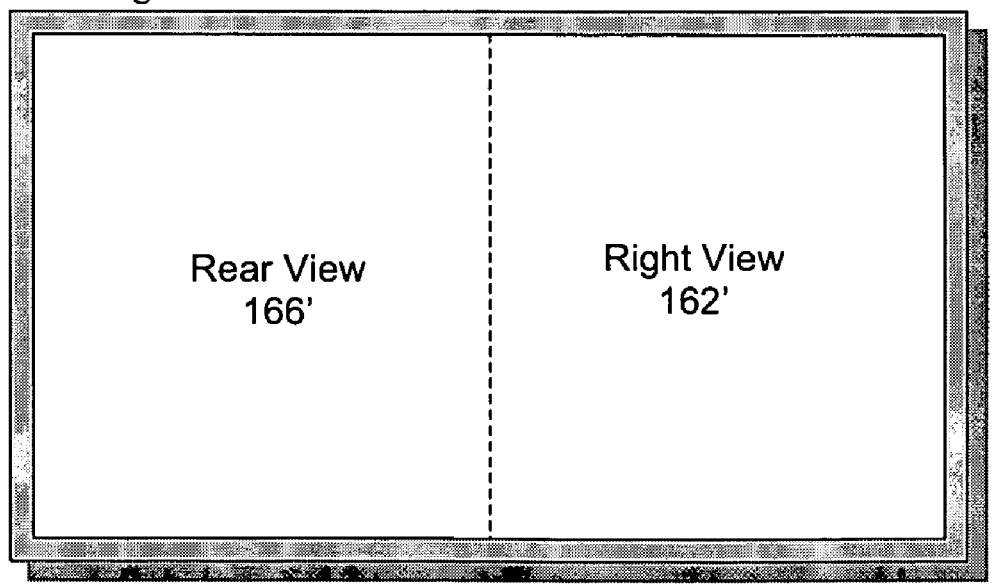
FIG. 5B represents reconfigured viewing surface of FIG. 5A when the vehicle is running in reverse.

FIG. 4A shows an example of the viewing surface 160 as seen by the driver. Rear view 166 is at the bottom of the viewing surface while the right view 162 and left view 164 are at the top right and the top left of the viewing surface 160 respectively. FIG. 5A shows an example of viewing surface 160' where a wider display is used and the side displays are at the two sides of the rear view 166'. Image processor 200 has the panoramic conversion and image stitching capability to compose this particular display. FIG. 4B and FIG. 5B present examples of reconfigured displays of FIG. 4A and FIG. 5A, when the vehicle is turning right or in reverse respectively.

Figure 6A:
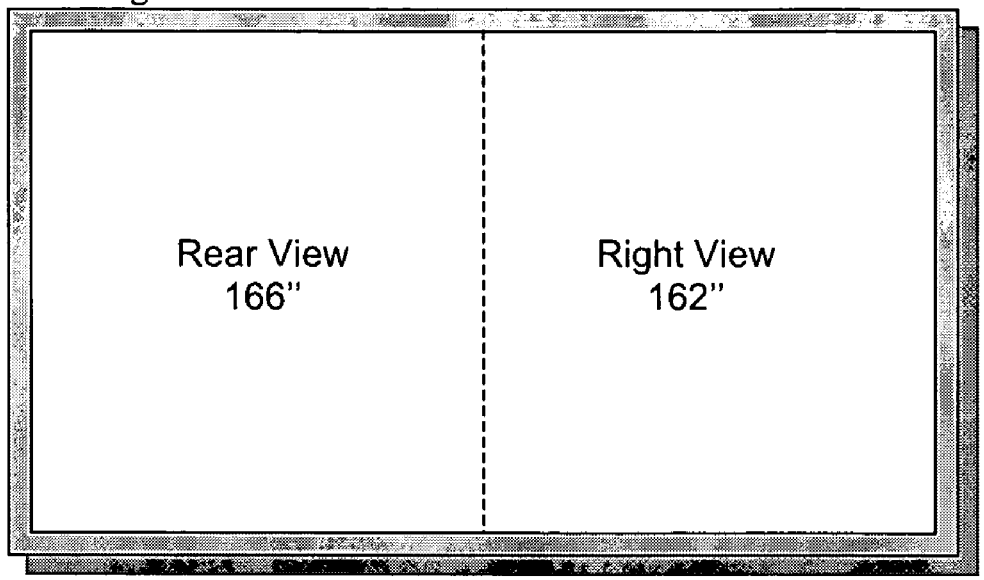
FIG. 6A represents reconfigured display when the vehicle is changing lanes.
Figure 6B:
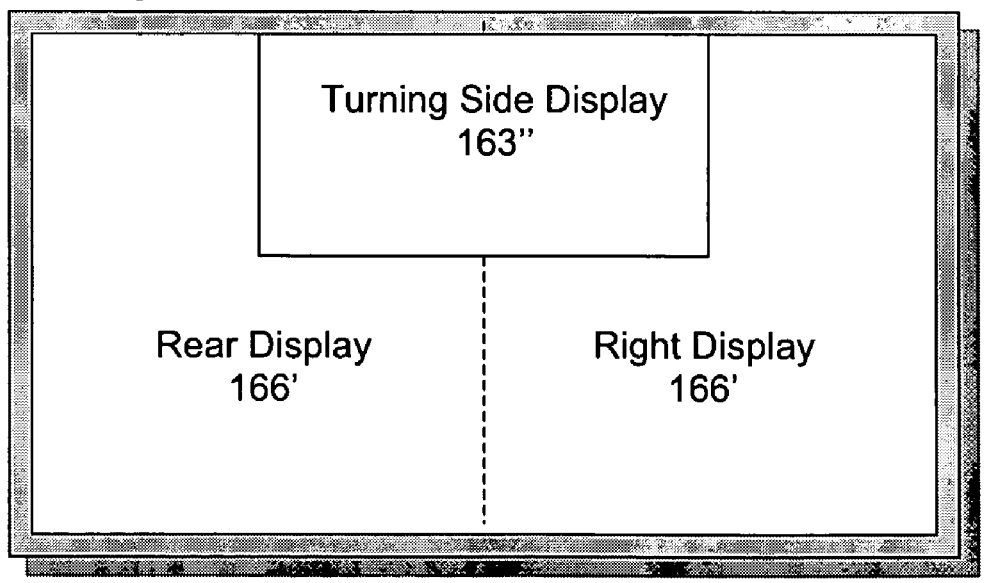
FIG. 6B represents reconfigured display when the vehicle is turning right and driver's view is obscured.

FIG. 6A is an example illustration of the reconfigured display of viewing surface 160 when the vehicle is changing lanes, moving into the right lane. In this example, the right front and rear of the vehicle is completely viewable, resulting in situation awareness with respect to everything on the right side of the vehicle. FIG. 6B is an example illustration of the display configured for turning right, when the right turning signal is engaged. Turning side view 903" of FIG. 3C is now displayed at the top middle portion of the display as turning side view 163". Rear view 166" and right view 166" are at the bottom of the display.

Figure 7:
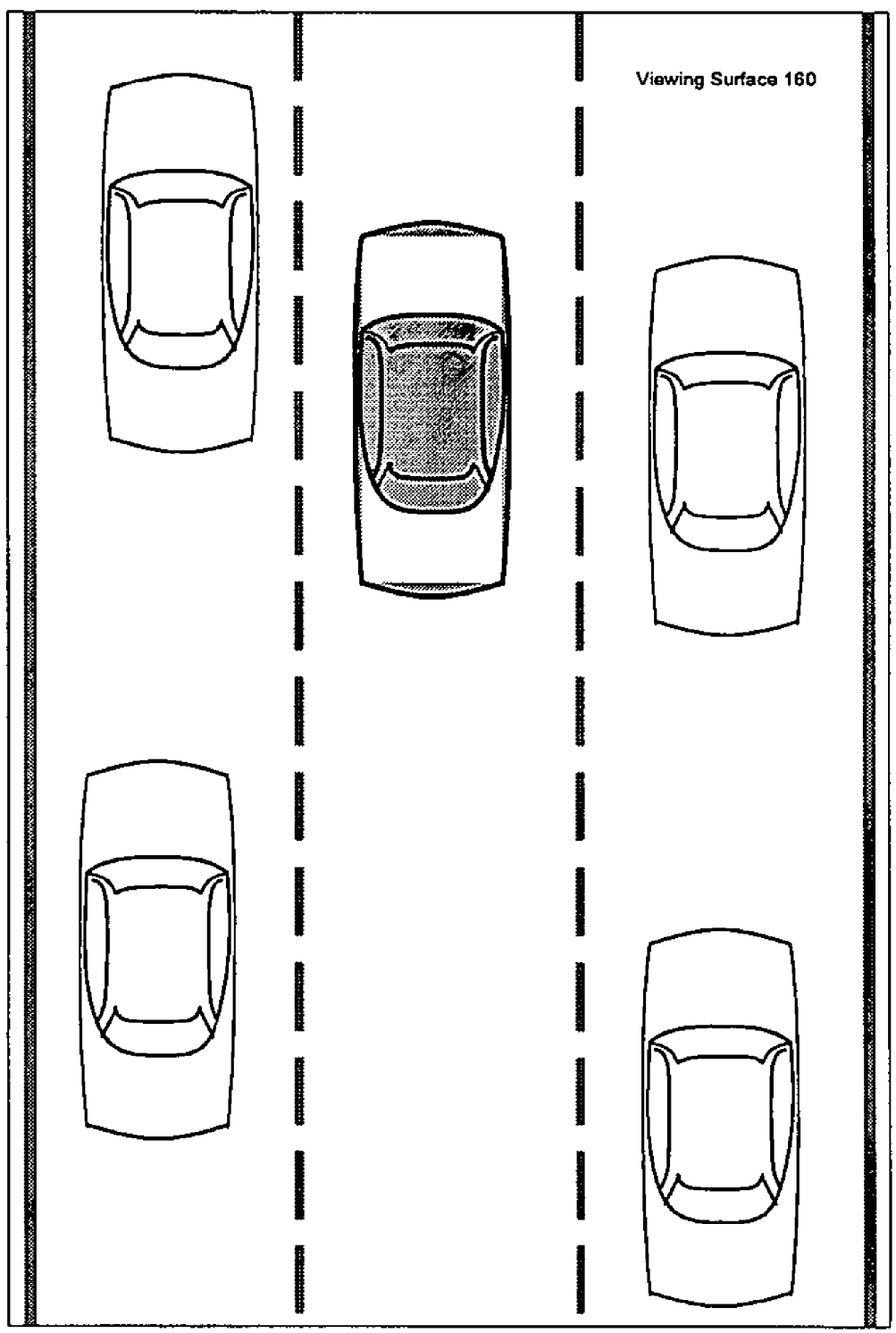
FIG. 7 represents a top view display showing the vehicle and adjacent objects.

FIG. 7 shows another example of the viewing surface 160. This particular configuration of the display is achievable via gathering visual information from image acquisition devices, as well as distance determination from ultrasound and radar sensors integrated with vision system 100. In this illustrated example, the vehicle with bold lines and grey shade is contains vision system 100 and is shown with respect to the surrounding setting, namely, other vehicle. This example implementation of the present invention greatly increases situational awareness and facilitates driving the vehicle. Two of the dimensions of each object are captured directly by the cameras. The shape and sizes of these vehicles and objects are reconstructed by extrapolating the views of the cameras according to the size and shape of the lanes and curbs. A more accurate visual account of the driving scene could be reconstructed by pattern recognition and look up tales for specific objects in a database.

It should be noted that the present invention is not limited to these illustrated examples; variations on the number and position of cameras as well as reconfigurations of the viewing surface are within the scope of this invention. Projection geometry data, projection optics data, and camera optics data are cover all these alternative implementations in image processor 200.

Preferably the display brightness is adjustable via ambient light sensors, via signal from the vehicle headlights, or via manual dimmer switch. In addition, preferably the size of the display surface is also adjustable via the driver. It is also preferred that the focal length of the displayed images lie considerably within the driver's field of focus as explained in U.S. Pat. No. 5,949,331 which is hereby incorporated by reference. However, it is also preferred that the display system focal length be adjusted according to the speed of the vehicle to make sure the images always form within the depth of focus of the driver. At higher speed, the driver naturally focuses on a longer distance. Such adjustments are achieved via speedometer signal 156 or transmission signal 154.

FIG. 6 shows an example of user inputs 150 in a vehicle vision system. Signal interface 151 receives signals from different components and interfaces with controller 101. Turning signal 152 for instance, when engaged while turning right, relays a signal to the signal interface 151 and onto the controller 101 and eventually to image processor 200. Once image processor 200 receives this signal, it configures the display in a way as to put emphasis on the right display 162 on viewing surface 160. FIG. 4B shows the viewing screen 160 under such conditions. Right view display now occupies half of viewing surface 160 with the other half dedicated to rear view display 166. FIG. 5B shows the same situation with a wide viewing surface embodiment. Other signals evoke other functions.

For instance, while parking the vehicle, the transmission preferably generates a signal as to emphasize the rear view. Other signals include steering signal which is engaged when the steering wheel is turned to one side by more than a preset limit, brake signal when is engaged when the brake pedal is depressed, transmission signal which conveys information about the traveling speed and direction, and speedometer signal which is gauged at various set velocities to input different signals. The display system, in the present invention, adjusts to different situations depending on any of these control parameters and reconfigures automatically to make crucial images available. A variety of control signals could be incorporated with image processor 200 and here we have mentioned only a few examples.

A variety of useful information could be displayed on the viewing surface 160 including road maps, roadside information, GPS information, and local weather forecast. Vision system 100 accesses these data either through downloaded files, or through wireless communications at driver's request. It then superimposes these data on the image frame data to compose the image for the display system. Important warning systems are also preferably received by the vision system and are displayed and broadcast on via the display system and audio signal interfaces. Vision system 100 could also be integrated with intelligent highway driving systems via exchanging image data information. It is also integrated with distance determiners and object identifiers as per U.S. Pat. No. 6,498, 620 B2 hereby incorporated by reference.

In one example implementation, vehicle vision system 100 comprises compression stage 132 and record device 142 to make a continuous record of events as detected by the cameras and audio devices. These features incorporate the function to save specific segments prior to and past impact in addition to driver intended events to be reviewed after mishaps like accidents, carjacking, and traffic violations. Such information could be used by the law enforcement agents, judicial authorities, and insurance companies.

In a different embodiment, the present invention provides a videoconference vision system covering up to 180° or 360° depending on a given setting. In this embodiment audio signals are also needed along with the video signals. In the illustrated example of FIG. 1 of the vision system 100, audio device array 117 provides audio inputs in addition to video inputs from the cameras. The audio signal data is converted to digital data via digitizer 118 and is superposed on the digital image frame data. A pan function is provided based on the triangulation of the audio signal to pan to individual speakers or questioners. The pan and zoom functions are provided digitally by image processor 200. In lack of optical zoom, a digital zoom is provided.

FIG. 7A relates to an example of a videoconference system. It shows the view of camera 110 at the center of a conference table. In this particular example camera 110 has a hemispheric lens system and captures everything above, and including, the table surface. Raw images are upside down, stretched, and disproportionate. The displayed images on viewing surface 160 are, however, distortion free and panoramically converted.

FIG. 7B shows viewing surface 160 where the speaker's image is blown up and the rest of the conference is visible in a straight form on the same surface.

In yet a different embodiment, the present invention provides a surveillance system with motion detection and object recognition. FIG. 2A shows an example of image processor 200, used in the surveillance system. Motion detector 270 evaluates successive input image frames and based on preset level of detected motion and signals alarm and sends the motion area co-ordinates to the distortion convolution stage 250. The input image frames are used to monitor area outside the current view window. The tracking co-ordinates are used by the distortion convolution stage 250 to calculate the view window for corrected display of the detected object. The distortion corrected object image can be resolution enhanced by motion compensated and temporal interpolation of the object. Object recognition and classification can also be performed.

Figure 8:
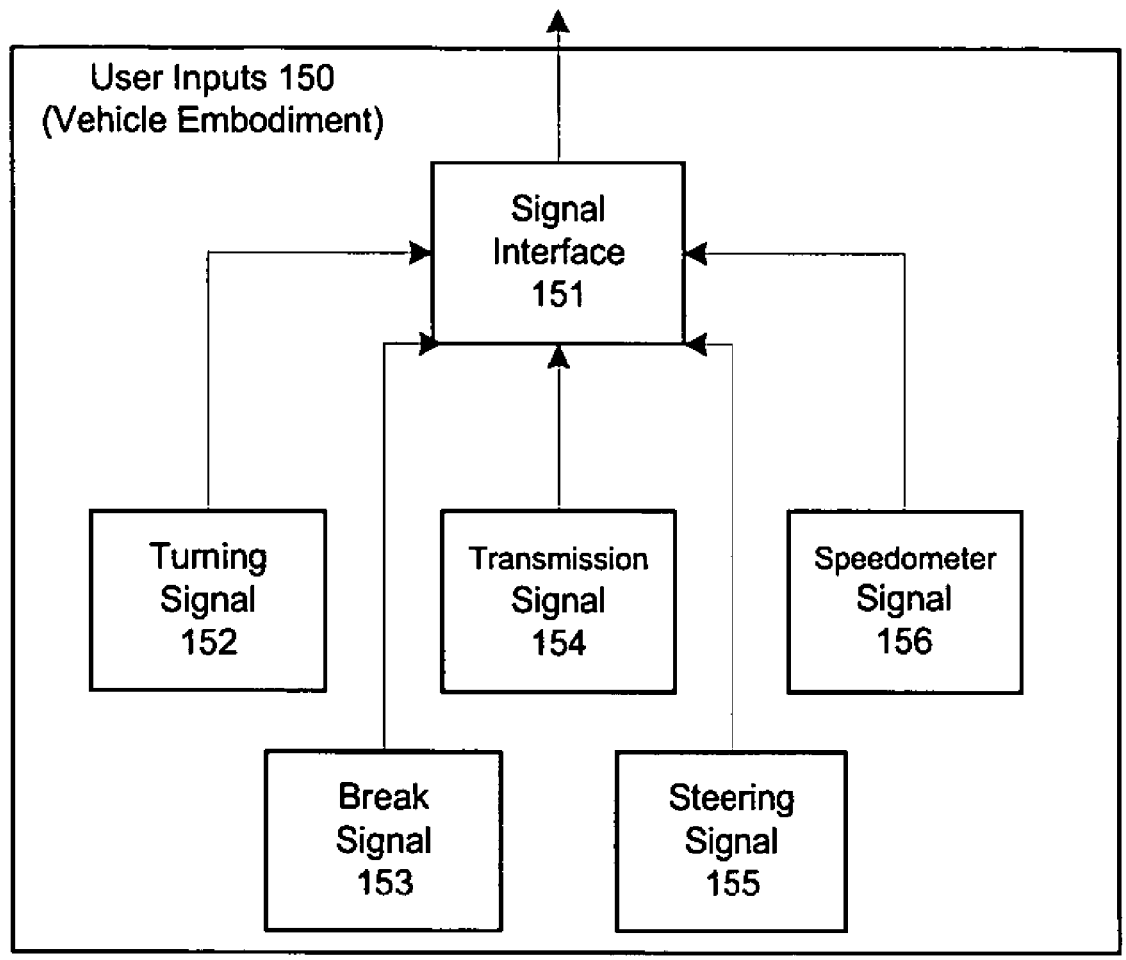
FIG. 8 represents an example of control inputs in a vehicle vision system.
Figure 9A:
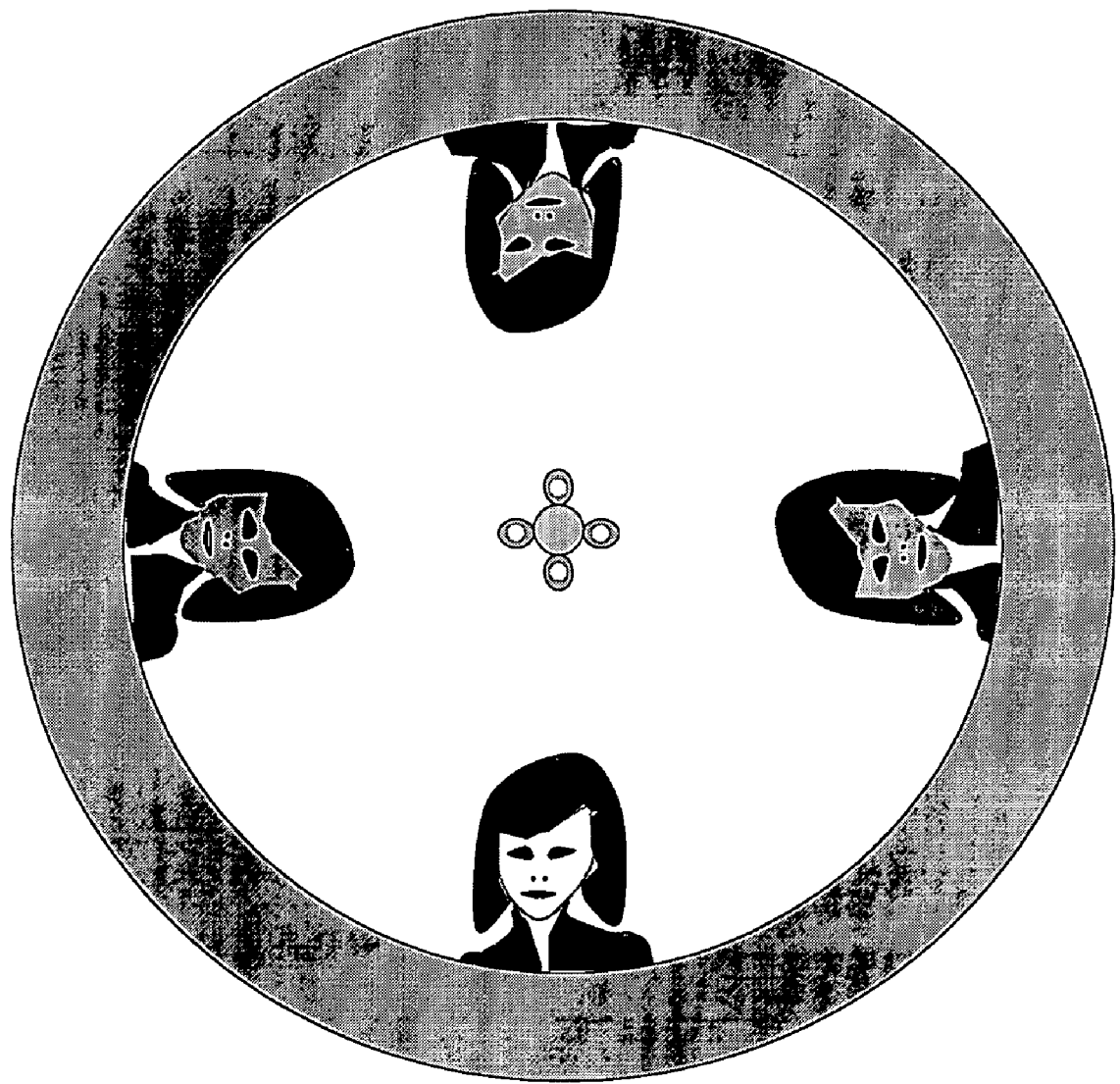
FIG. 9A represents the view of a hemispheric, 180° (2π steradians) view camera, set in the center of a conference table in a videoconference vision system example.
Figure 9B:
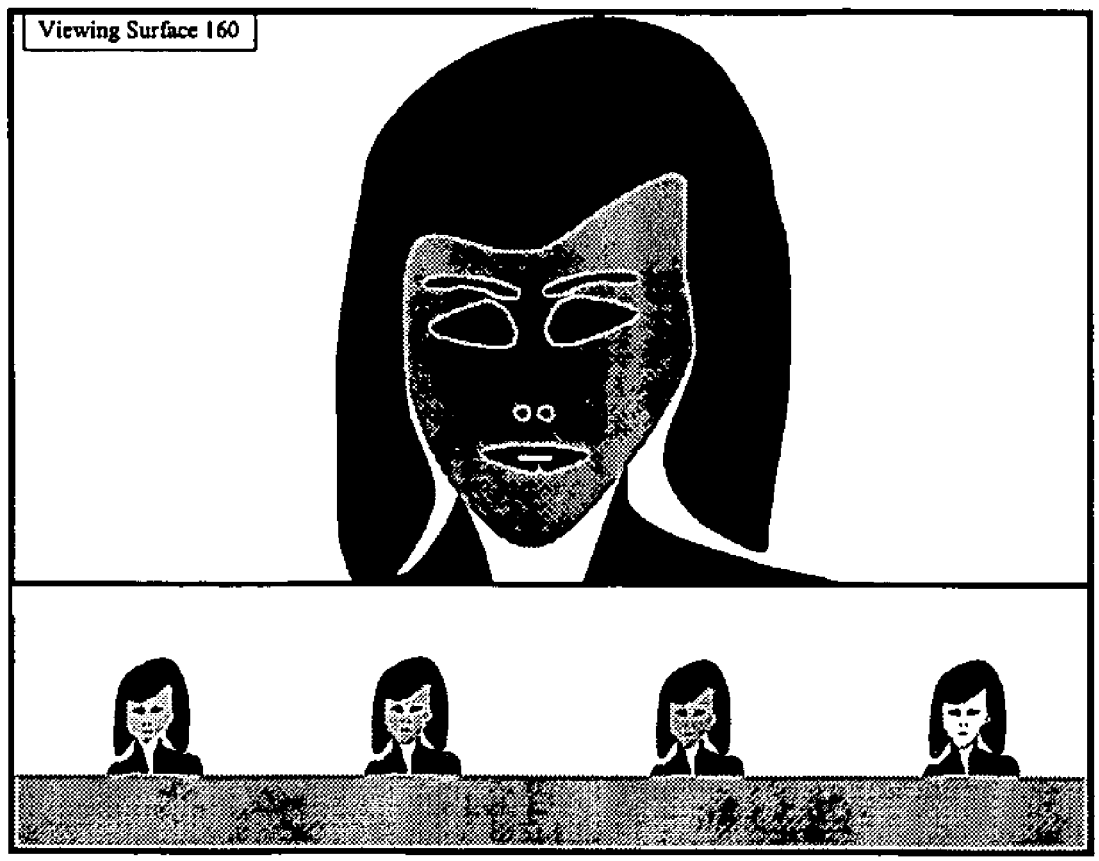
FIG. 9B represents the display of a videoconference vision system example.
Figure 10:
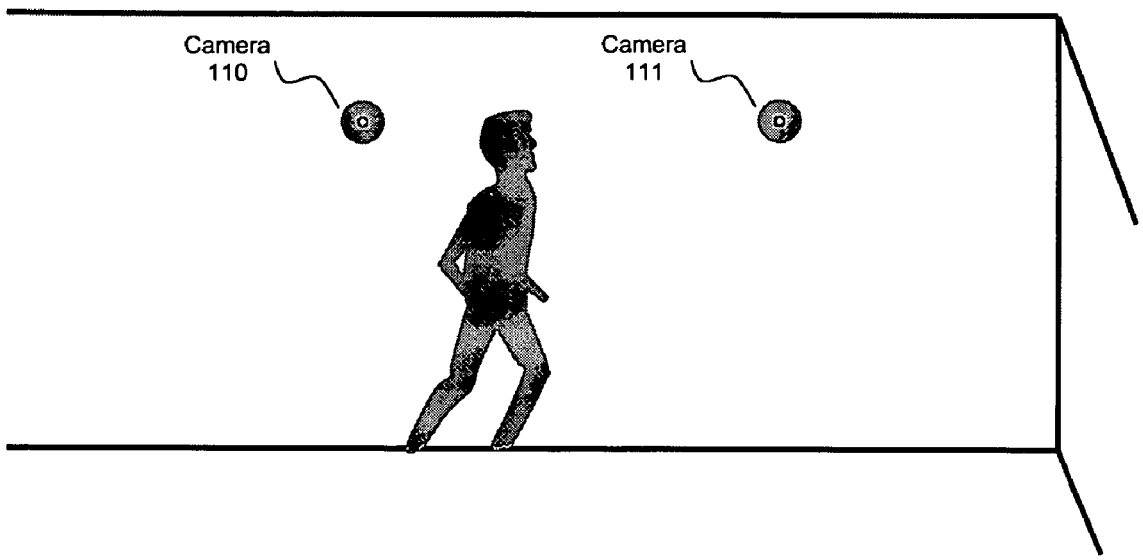
FIG. 10 represents a hallway or a building wall with two cameras installed on the walls as part of a surveillance system example.
Figure 11A:
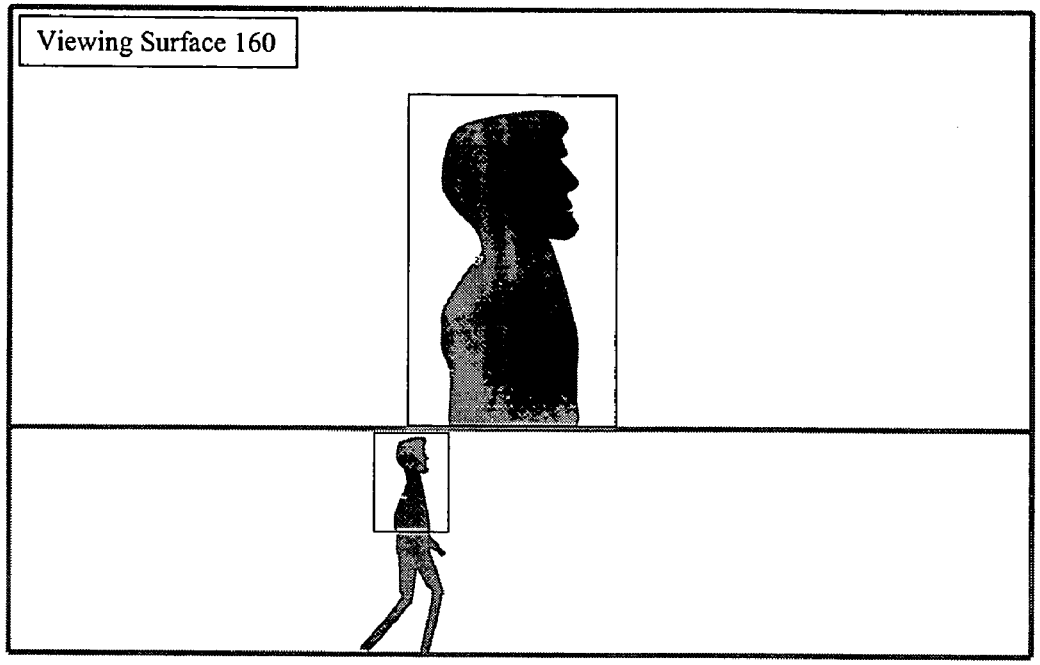
FIG. 11A represents the display of a surveillance system example of the invention.
Figure 11B:
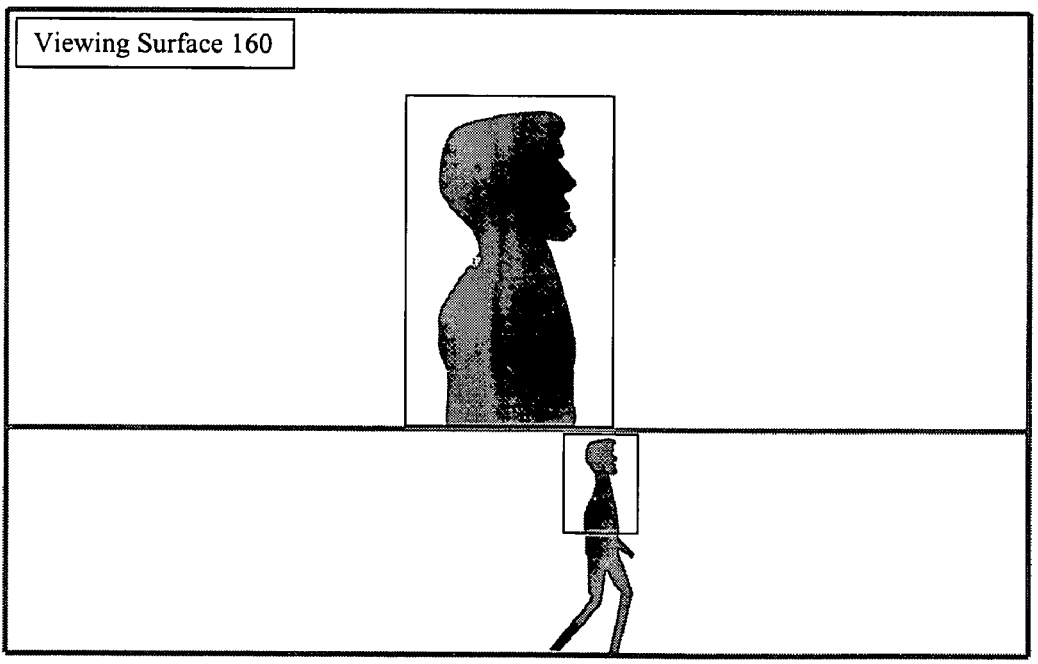
FIG. 11B represents the same display as FIG. 9A at a later time.

FIG. 8 shows an illustrated example of a surveillance system. Cameras 110 and 111 are in a hallway where they are mounted on the walls. These two cameras monitor traffic through the hallway. Image processor 200 in this embodiment uses motion detector and tracker 270 to track the motion of an object as it passes through the hallway. The viewing surface 160 in this example is shown in FIG. 9A at a certain time and FIG. 9B at a later time. The passage of the object is thoroughly captured as he moves from the field of view of one camera to the other. The vision system can also perform resolution enhancement by temporal extraction to improve object detail and recognition and displays it at the top of the image in both FIG. 9A and FIG. 9B. The top portion in this figure is provided in full resolution or by digitally zooming on the moving object. The recognition and tracking of the object is achieved via comparing the detect object in motion from one frame with the next frames. An outline highlights the tracked object for ease of recognition.

The invention claimed is:

1. A panoramic vision system having associated camera, display optics and geometric characteristics, said system comprising:
    (a) a plurality of image acquisition devices to capture image frame data from a scene and to generate image sensor inputs, said image frame data collectively covering up to a 360° field of view, said image acquisition devices having geometric and optical distortion parameters;
    (b) a digitizer coupled to the plurality of image acquisition devices to sample and convert the image frame data and the image sensor inputs into digital image data;
    (c) an image processor coupled to the digitizer comprising:
    (i) an image measurement device to receive the digital image data and to measure the image luminance histogram and the ambient light level associated with the digital image data;
    (ii) a luminance correction module coupled to the image measurement device to receive the digital image data along with the camera, display optics and geometric characteristics, the image luminance histogram and the ambient light level, and to correct for luminance and chrominance non-uniformities, by separately processing for the red, green and blue components associated with the digital image data, and to optimize the luminance range of selected regions within the digital image data;
    (iii) a convolution stage coupled to the luminance correction module to combine the geometric and optical distortion parameters including the image sensor inputs, the camera, display optics and geometric characteristics and imperfections associated therein to form convoluted distortion parameters;
    (iv) a distortion correction module coupled to the convolution stage to generate and apply a distortion correction transformation based on the convoluted distortion parameters to the digital image data to generate corrected digital image data;
    (v) a display controller coupled to the distortion correction module to synthesize a composite image from the corrected digital image data; and
    (d) a display system coupled to said image processor to display the composite image on a viewing surface for viewing, said composite image being visually distortion free.

2. The panoramic vision system of claim 1, wherein said plurality of image acquisition devices and the digitizer are implemented by a plurality of digital cameras.

3. The panoramic vision system of claim 1, wherein the display system is a light projection system, and wherein, the geometric and optical distortion parameters are concatenated in order to pre-correct for the associated geometric and optical distortions.

4. The panoramic vision system of claim 1, further comprising at least one ambient light sensor, at least one lighting signal, and at least one user dimmer switch, wherein the brightness of the display system is adjusted according to at least one of said ambient light sensor, separate lighting signal, and user dimmer switch.

5. The panoramic vision system of claim 1, further comprising a controller wherein said controller is adapted to relay a set of user parameters to the panoramic vision system to concatenate said user parameters with distortion parameters based on a set of selected viewing functions and preferences.

6. The panoramic vision system of claim 1, further comprising a control interface coupled to the image processor which is adapted to receive and relay user inputs and control parameters.

7. The panoramic vision system of claim 1, wherein said image processor is further adapted to send exposure control commands to the image acquisition devices for iris and exposure time control.

8. The panoramic vision system of claim 1, further comprising a viewing surface, wherein the position and size of the composite image on the viewing surface is adjustable according to a set of user inputs.

9. The panoramic vision system of claim 1, provided as a vehicle vision system.

10. The vehicle vision system of claim 9, wherein the display system is adapted to form a composite image in the forward field of vision of a driver positioned within the vehicle, namely on at least one of the group consisting of: dashboard, windshield, roof, and fascia.

11. The vehicle vision system of claim 10, wherein the display system is adapted to form a composite image on two viewing surfaces on the interior corners of the windshield and fascia in order to mimic vehicle side mirrors.

12. The vehicle vision system of claim 9, wherein the focal point of the composite image falls in the forward field of focus associated with a driver positioned within the vehicle.

13. The vehicle vision system of claim 9, wherein the focal point of the display system is practically infinite.

14. The vehicle vision system of claim 9, wherein the vehicle vision system reconfigures amongst different configurations according to input from the group consisting of: a turning signal, a transmission system, a brake system, a steering system, and a speedometer.

15. The vehicle vision system of claim 14, wherein the display system is adapted to enhance the right view from the vehicle when the vehicle turning signal is set to turn right and to enhance the left view from the vehicle when the vehicle turning signal is set to turn left.

16. The vehicle vision system of claim 14, wherein the display system is adapted to enhance the right view from the vehicle when the vehicle steering wheel is turned toward the right by a preset angle and to enhance the left view from the vehicle when the vehicle steering wheel is turned toward the left by a preset angle.

17. The vehicle vision system of claim 14, wherein the display system is adapted to enhance the rear view from the vehicle when the vehicle is operating in reverse.

18. The vehicle vision system of claim 14, wherein the vision system is adapted to enhance at least one of the front and rear corner side view from the vehicle if the direct view is obscured by adjacent objects.

19. The vehicle vision system of claim 18, further comprising at least one of a laser and a radar sensor and wherein the image processor is further adapted to use the sensors to detect distances between the exterior of the vehicle and an object, and to provide audio and visual warnings when the distance between the exterior of the vehicle and the object falls within limits defined by the speed of the vehicle.

20. The vehicle vision system of claim 19, wherein the display system is configured to show the vehicle and it's surrounding setting as viewed from the top by capturing two dimensions via cameras and extrapolating in the third dimension according to lane and curb patterns and object look-up databases.

21. The vehicle vision system of claim 18, wherein the image processor is further adapted to detect at least one of road, lane, and curb edge markings and to provide audio and visual warnings when the exterior of the vehicle approaches said edge markings.

22. The vehicle vision system of claim 21, wherein, the image processor is further adapted to detect the position of a designated area and to provide directional indicators on the display system to guide vehicle movement to the designated area.

23. The vehicle vision system of claim 9, further comprising at least one of the group consisting of: ambient light sensors, oncoming headlight sensors, and driver dimmer switch, and wherein the brightness and contrast associated with the display system is adjusted according to the readings of at least one of the ambient light sensors, oncoming headlight sensors, and driver dimmer switch.

24. The vehicle vision system of claim 9, further comprising a secure black box device and a trigger device for recording all the digital image data associated with a period of time defined around activation of the trigger, said trigger bring adapted to be activated by at least one of the group consisting of: a user, a collision, a hijacking, and a theft.

25. The vehicle vision system of claim 9, further comprising an integrated GPS navigation unit which allows for road maps and roadside information to be displayed on the display system.

26. The surveillance vision system of claim 24, wherein the image processor is further adapted to define a set of designated protected areas, to track a plurality of objects, and to generate audio and visual warnings when such objects enter into designated protected areas, and wherein the display system is reconfigured to highlight said objects when such objects enter into the designated protected areas.

27. The panoramic vision system of claim 1, further comprising a plurality of surveillance sensors, said system being provided as a surveillance vision system.

28. The surveillance vision system of claim 27, wherein the image processor is further adapted to perform motion detection and object tracking using the surveillance sensors.

29. The surveillance vision system of claim 27, wherein the image processor is adapted to provide a set of visual and audio signals when motion is detected by surveillance sensors.

30. The panoramic vision system of claim 1, further including a set of audio sensors and wherein the digitizer is further adapted to convert the audio sensor inputs into digital audio data, said system being provided as a videoconferencing vision system.

31. The videoconference vision system of claim 30, wherein the image processor and the display system are further adapted to generate and display a zoomed image of a videoconferencing user according to the strength and direction of the audio signal generated by the videoconferencing user.

32. A method for providing panoramic vision using a panoramic vision system having camera, display optics and geometric characteristics as well as geometric and optical distortion parameters, to generate a composite image that covers up to 360° or 4π steradians, said method comprising:
(a) acquiring image frame data from a scene, said image frame data collectively covering up to 360° or 4π steradian field of view, and generating a set of image senor inputs;
(b) converting the image frame data and the image senor inputs into digital image data, said digital image data being associated with an image luminance histogram and an ambient light level;
(c) obtaining the camera, display optics and geometric characteristics, the image luminance histogram and the ambient light level and correcting for luminance and chrominance non-uniformities, separately for the red, green and blue components associated with the digital image data, to optimize the luminance range of selected regions within the digital image data;
(d) convoluting the geometric and optical distortion parameters including the image sensor inputs, the camera, display optics and geometric characteristics and imperfections associated therein to form convoluted distortion parameters;
(e) generating and applying the distortion correction transformations to the digital image data, said distortion correction transformations being based on the convoluted geometric and optical distortion parameters to generate corrected digital image data;
(f) synthesizing a composite image from the corrected digital image data; and
(g) displaying the composite image on a viewing surface for viewing, said composite image being visually distortion free.

33. The method of claim 32, wherein the correction transformation is achieved by:
(i) obtaining a grid data set covering the entire space of the geometric and optical distortion parameters;
(ii) computing a correction transformation corresponding to each data set on the grid of (i), and
(iii) interpolating adjacent grid transformation to fit the actual image frame transformation parameters.

34. The method of claim 33, wherein (i) and (ii) are executed once off line and the transformation grid is accessed for each image frame correction.

35. The method of claim 33, wherein (i) and (ii) are done dynamically under varying conditions.

36. The method of claim 33, wherein the pixel map associated with the transformation is represented via warp maps.

37. The method of claim 36, wherein the warp maps are parameterized in terms of one of incremental polynomials and positional polynomials.

38. The method of claim 32, further generating and relaying exposure control commands to a plurality of image acquisition devices.

39. The method of claim 32, further including receiving control and user parameters to convolute with distortion parameters.

40. The method of claim 39, further reconfiguring the display system according to a set of control inputs.

41. The method of claim 32, further including motion detection and tracking.

42. The method of claim 39, further including adjusting brightness, contrast, and size of the composite image according to sensors and user inputs.

43. The method of claim 39, further adjusting the focal length of the composite image according to a set of control parameters.

44. An image processor, to receive digital image data, correct luminance non-uniformities and image distortions, form a composite image from said digital image data, and control parameters in a panoramic vision system having associated camera, display optics and geometric characteristics as well as geometric and optical distortion parameters, said panoramic vision system using a plurality of image acquisition devices to capture image frames from a scene and to generate digital image data and image sensor inputs and a digitizer to convert the digital image data and the image sensor inputs into digital image data, said image processor comprising:
  (a) an image measurement device to receive the digital image data and to measure the image luminance histogram and the ambient light level associated with the digital image data;
  (b) a luminance correction module coupled to the image measurement device to receive the digital image data along with the camera, display optics and geometric characteristics, the image luminance histogram, and the ambient light level and to correct for luminance and chrominance non-uniformities, by separately processing for all red, green and blue components associated with the digital image data, and to optimize the luminance range of selected regions within the digital image data;
  (c) a convolution stage coupled to the luminance correction module to combine the geometric and optical distortion parameters including the image sensor inputs, the camera, display optics and geometric characteristics and imperfections associated therein to form convoluted distortion parameters;
  (d) a distortion correction module coupled to the convolution stage to generate and apply a distortion correction transformation, based on the convoluted distortion parameters, to the digital image data to generate corrected digital image data; and
  (e) a display controller coupled to the distortion correction module to synthesize a composite image from the corrected digital image data.

45. The image processor of claim 44, further adapted to generate and relay exposure control commands to image acquisition devices.

46. The image processor of claim 44, further adapted to receive control and user parameters to convolute with distortion parameters.

47. The image processor of claim 46, further adapted to reconfigure the display system according to a set of control inputs.

48. The image processor of claim 46, further adapted to adjust the focal length of the composite image according to a set of control parameters.

49. The image processor of claim 44, further adapted for motion detection and tracking components.

50. The image processor of claim 44, further adapted for adjusting the brightness, contrast, and size of the synthesized image according to a plurality of sensors and a set of user inputs.

* * * * *